Feb. 27, 1951 P. D. HESS 2,543,020
FLUID FLOW METER
Filed Sept. 8, 1947 2 Sheets-Sheet 1

*INVENTOR.*
PAUL D. HESS
BY
*ATTORNEY*

Feb. 27, 1951 P. D. HESS 2,543,020
FLUID FLOW METER
Filed Sept. 8, 1947 2 Sheets-Sheet 2

INVENTOR.
PAUL D. HESS
BY
ATTORNEY

Patented Feb. 27, 1951

2,543,020

UNITED STATES PATENT OFFICE 2,543,020

FLUID FLOWMETER

Paul D. Hess, Glasford, Ill.

Application September 8, 1947, Serial No. 772,831

3 Claims. (Cl. 73—189)

(Granted under the act of March 3, 1883, as amended April 30, 1928; 370 O. G. 757)

My invention relates to the conversion of dynamic fluid pressure into an electrical impulse and more particularly to an apparatus for electrical indication of the pressure and direction of the motion of a fluid.

An example of the present state of the art is where the speed of a ship is ascertained by underwater log equipment that normally utilizes the Pitot static tube which is an instrument for indication of the dynamic pressure of a fluid in motion by determination of the static and velocity pressure differential. The value is represented by H in the formula, $$V = \sqrt{2gH}$$

This instrument has found numerous applications in similar determinations, however, in all cases the method of transmitting and indicating the magnitude of differential pressure at remote locations is either inaccurate or an elaborate system.

The primary object of this invention is to provide an apparatus for determination of the dynamic pressure and direction of a fluid in motion, regardless of how the motion was created, and accurately transmit this indication to a remote instrument or group of indicating, recording or computing instruments in a simple, efficient manner.

The invention also resides in certain novel characteristics which facilitate execution of the primary object and contribute to the simplicity of application and reliability of operation. Other objects and advantages of the invention will become apparent from the following detailed description taken in connection with the accompanying schematic arrangements of my invention in which.

Figure 1:
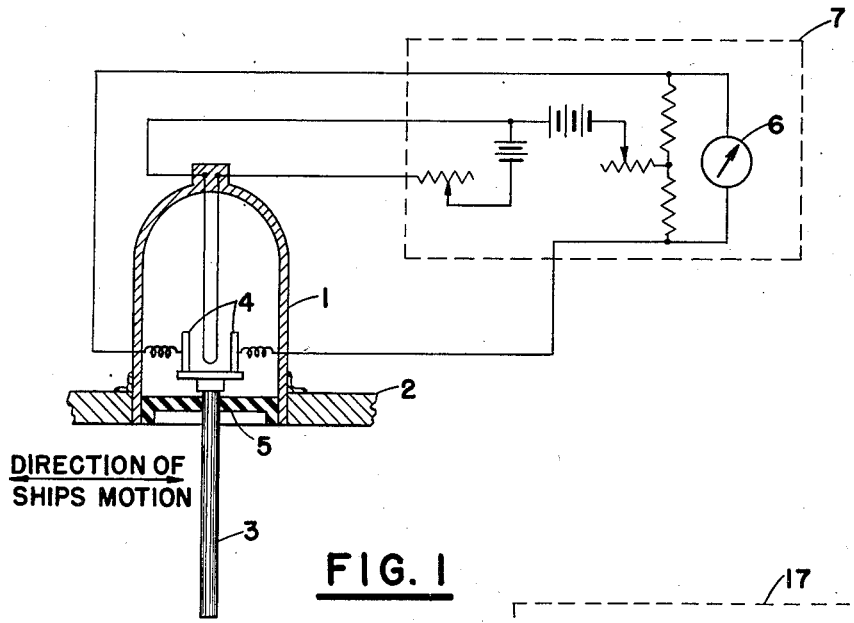
Figure 1 is one form for determination of ship's motion.

While the invention is susceptible of various modifications and alternative constructions, I have shown in the drawing and will herein describe several embodiments. It is to be understood, however, that I do not intend to limit my invention by such disclosure for I aim to cover all modifications and alternative constructions falling within the spirit and scope of the invention as defined in the appended claims.

The changing of a hydrodynamic condition at a selected location into an electrical impulse is essential to the efficient transmitting and recording of flow data. Once the proper electrical signal is established, it can be connected into various electrical systems for computation of desired results.

One method of ascertaining the dynamic pressure for conversion to an electrical impulse is to measure the force or drag applied to a body in the fluid. In the formula $$D = \frac{C_d p V^2}{2} A$$

$D$=drag, $p$=density of the fluid, $C_d$=the coefficient of drag depending upon the shape and position of the body and on the Reynolds number and $A$=the projected area on the body. The value of $C_d$ is best determined by experiment and a considerable number of geometrical shapes have been tested at various values of Reynolds number. A cylindrical rod for which the value of $C_d$ is approximately unity for Reynolds numbers between 10 and $10^5$ is an example. Other shapes can be selected that have more or less drag and for which the coefficient is reasonably constant over a range of Reynolds numbers or for other desired results. It is obvious from the aforementioned example that the velocity of a fluid is directly proportional to the square root of the force on the rod. This force can be measured as a deflection by supporting the rod on a diaphragm such that one end of the rod projects into the fluid and the deflection is measured on the opposite end as indicated in the drawings. If the diaphragm is fairly rigid, the deflection will be small and the effective area of the rod in the fluid will not differ materially with a velocity change.

The "telegage," Patent No. 2,155,419 (1939) reissued as No. 21,361 (1940) and Patent No. 2,155,420 (1939) reissued as No. 21,372 (1940) to Dr. Gunn, is an apparatus for electrically measuring mechanical displacement as is my invention described in my co-pending application Serial No. 668,053 filed May 8, 1946, for Deflection Scope, which has matured into Patent No. 2,527,550. These apparatuses are electronic tubes so constructed that a small external deflection will move the plate or plates of the tube relative to the anode and thus change the flow of current through the tube. This change can be used to unbalance a bridge circuit and the unbalance recorded with suitable electrical instruments which can be calibrated to measure velocity, and so forth.

The adaptation of the foregoing principles and structure for measuring the speed of a ship forward or in reverse is shown schematically in Figure 1 where the "telegage" 1 is inserted in the ship's bottom 2. A cylindrical probe 3, which is constructed of corrosive resistant material to withstand sea water, is connected to plates 4 and extends downward through a reasonably stiff flexible diaphragm 5 into the stream. An electric impulse varied in accordance with the hydraulic condition is conventionally transmitted to the indicator 6 at a remote station 7.

Figure 2:
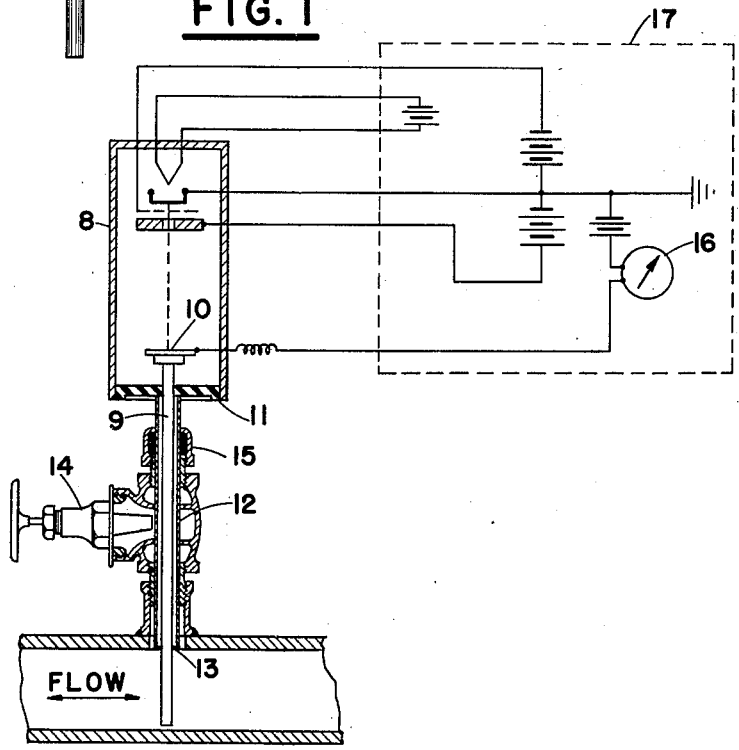
Figure 2 is another form for measuring the flow of a liquid in a conduit.

A further embodiment of my invention is schematically shown in Figure 2 where the "deflection scope" 8 is used to determine the flow of a fluid in one direction or the reverse within a pipe or conduit. The cylindrical probe 9 is connected to a plate 10 and extends downward through the reasonably stiff flexible diaphragm 11 of the tube, tubing 12 and diaphragm 13 into the stream. The operation of the "deflection scope" and its associated circuit is described in my above-mentioned patent application Serial No. 668,053 filed May 8, 1946. A gate valve 14 and stuffing box 15 surrounding the tubing 12 permits removal of the "deflection scope" 8, cylindrical probe 9, diaphragms 11 and 13 and tubing 12 as a unit without disturbing the flow. The electric impulse in this arrangement is similarly transmitted to an indicator 16 at a remote station 17. This indication would be a measure of the velocity, however, the volume could easily be ascertained by the knowledge and use of the cross-sectional pipe area where the probe is located.

Figure 3:
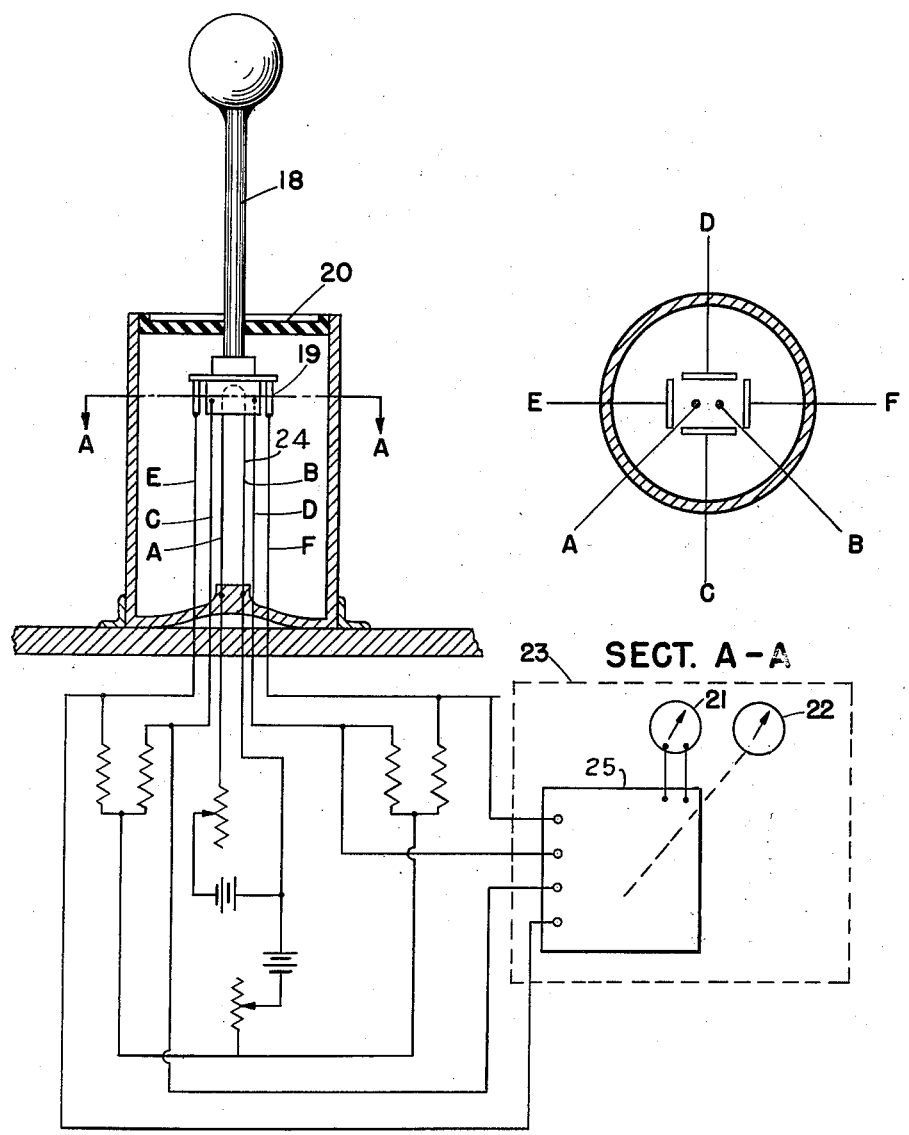
Figure 3 is still another form for determination of the intensity and direction of wind.

A third embodiment of my invention is schematically shown in Figure 3 where it is arranged to determine the direction as well as the intensity of the wind. A cylindrical spherical topped probe 18 is rigidly connected to the four plates 19 forming the sides of a boxlike shape and extends upward through the reasonably stiff diaphragm 20 into the air. Any lateral movement of the box, as a result of air pressure on the probe, will result in a change of current through each of the four plates. The change in current through opposite plates will be inversely proportional to each other and the intensity of the wind from a chosen direction will be the vector sum of the current change between the pairs of plates. The direction of the wind may be established in terms of the angle $\theta$ from north and is determined from the relation, tangent $\theta$ equals the ratio of the direction components of the intensity or the ratio of change in current through the pairs of plates. Current changes resulting from the wind condition are conventionally transmitted to the velocity indicator 21 and the direction indicator 22 at a remote station 23.

The plates 19 are insulated from the probe 18, and are arranged in two pairs. Each pair of plates are parallel to each other and perpendicular to the plates of the other pair to establish two perpendicular planes, the several plates being substantially equidistant from the cathode 24. A resistance is connected to each plate, and a source of anode potential is connected between the resistances and the cathode 24 to cause a current flow through the several anodes.

When the plates 19 are equidistant from the cathode 24, the voltage drops through the several resistances will be equal, so that the anodes are all at the same potential. However, movement of the plates 19 in any direction will move at least one plate toward the cathode to increase the conduction therethrough and the other parallel plate from the cathode to decrease the conduction therethrough, thereby causing a difference in potential to exist between the plates of at least one pair. Obviously both pairs of plates may be shifted at the same time, and the difference in the potential of the plates in each pair of plates is a measure of the deflection of the probe 18 in a plane perpendicular to the plates. The tube thus produces two output voltages each representing a coordinate of the deflection of the probe 18 in polarity and magnitude.

The output voltages are impressed on a component resolver 25, which converts the rectangular coordinates into polar coordinates of an angle and a resultant magnitude. The resolver may be of any well-known type, and may for example be similar to that described in Patent No. 2,404,387 to Lovell et al. for Electric Computing System. This system employs a follow-up system controlled by two voltages representing rectangular components to reproduce the angle having a tangent equal to the ratio of the two voltages, and also produces a voltage proportional to the vector sum of the two voltages. The indicator 21 therefore indicates the output voltage of the resolver, and the indicator 22 is driven by the follow-up system.

The invention described herein may be manufactured and used by or for the Government of the United States for governmental purposes without the payment of any royalties thereon or therefor.

What I claim is:

1. An instrument for determining the direction and velocity of the wind comprising a source for the emission of charged particles, a plurality of individualized anodes forming an equilateral polygon for the reception of said particles in a varying degree depending upon their respective distances from said source, a vacuum tube enclosing said source and anodes, a stiff diaphragm in one end of said tube, a probe attached to said anodes extending through said diaphragm into the wind and capable of movement in response to action of the wind, an individualized resistance connected to each of said anodes, a source of electrical potential connected to said resistances and said source, and a plurality of electrical indicators interconnecting said anodes for indicating current changes resulting from movement of said particles as influenced by action of the probe.

2. Apparatus for measuring fluid flow comprising a vacuum chamber having a flexible diaphragm therein, a movable probe extending through said flexible diaphragm and projecting into said fluid, a cathode for the emission of charged particles within said chamber, a movable anode structure attached to said probe and comprising four individualized plates equiangularly disposed about said cathode for reception of said particles in varied degree depending upon their displacement from said cathode, an electrical circuit connected to said cathode and said individualized plates, and indicating means interconnecting pairs of oppositely disposed plates responsive to variations in current resulting from movement of said plates in response to fluid action on said probe, whereby each of said indicators indicates a component of movement of the fluid.

3. In a velocimeter for measuring the velocity of a fluid, a sealed vacuum chamber having a flexible diaphragm therein, a probe resiliently supported by said diaphragm extending into said fluid and into said sealed vacuum chamber movable by said fluid in accordance with the direction and velocity of flow thereof, a cathode within said vacuum chamber, an anode structure supported by said probe and comprising four individualized anodes equiangularly disposed about and equidistant from said cathode, a resistance connected to each of said anodes respectively, a source of anode potential connected between said resistances and said cathode, and electrical indicating means connected between alternate ones of said anodes to indicate potential differences therebetween.

PAUL D. HESS.

REFERENCES CITED

The following references are of record in the file of this patent:

UNITED STATES PATENTS

| Number | Name | Date |
|---|---|---|
| 2,024,571 | Gent | Dec. 17, 1935 |
| 2,155,419 | Gunn | Apr. 25, 1939 |
| 2,383,757 | Ziebolz | Aug. 28, 1945 |

FOREIGN PATENTS

| Number | Country | Date |
|---|---|---|
| 369,588 | Great Britain | Mar. 21, 1932 |